(12) United States Patent
Jansen et al.

(10) Patent No.: US 12,333,353 B2
(45) Date of Patent: *Jun. 17, 2025

(54) SYSTEMS AND METHODS TO EXTEND AN INTERACTIVE SPACE ACROSS MULTIPLE PLATFORMS

(71) Applicant: QUALCOMM Incorporated, San Diego, CA (US)

(72) Inventors: Paulo Jansen, San Mateo, CA (US); Benjamin Lucas, San Francisco, CA (US); Forest Rouse, Oakland, CA (US); Mayan Shay May-Raz, San Francisco, CA (US); Joshua Hernandez, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,356

(22) Filed: Mar. 14, 2024

(65) Prior Publication Data

US 2024/0248772 A1 Jul. 25, 2024

Related U.S. Application Data

(63) Continuation of application No. 15/787,564, filed on Oct. 18, 2017, now Pat. No. 11,966,793.

(51) Int. Cl.
*G06F 9/54* (2006.01)
*G06F 3/04815* (2022.01)
(Continued)

(52) U.S. Cl.
CPC .......... *G06F 9/541* (2013.01); *G06F 3/04815* (2013.01); *G06F 13/102* (2013.01); *H04L 41/08* (2013.01); *H04L 67/125* (2013.01); *A63F 2300/1087* (2013.01); *G06F 2203/04802* (2013.01)

(58) Field of Classification Search
None
See application file for complete search history.

(56) References Cited

U.S. PATENT DOCUMENTS

8,730,156 B2 * 5/2014 Weising ................ G06F 3/0304
348/47
9,983,697 B1 5/2018 Gribetz
(Continued)

*Primary Examiner* — Atta Khan
(74) *Attorney, Agent, or Firm* — QUALCOMM Incorporated (57) ABSTRACT

Systems and methods to extend an interactive experience across multiple platforms are presented herein. The interactive experience may take place in an interactive space. The interactive space as experienced by a user of a host device (e.g., headset) may be extended to one or more mobile computing platforms. The host device may present views of virtual content perceived to be present within the real world. A given mobile computing platform may be positioned at or near the host device. The mobile computing platform may take images/video of the user of the host device. The mobile computing platform may superimpose views of the virtual content onto the images/video from the perspective of the mobile computing platform. The virtual content presented at the mobile computing platform may be perceived to be in the real world.

14 Claims, 4 Drawing Sheets

(51) Int. Cl.
*G06F 13/10* (2006.01)
*H04L 41/08* (2022.01)
*H04L 67/125* (2022.01)

(56) References Cited

U.S. PATENT DOCUMENTS

| | | | |
|---|---|---|---|
| 11,057,614 B1* | 7/2021 | Eble | H04N 13/351 |
| 11,850,520 B2* | 12/2023 | Constantin | G06Q 10/06393 |
| 11,966,793 B1 | 4/2024 | Jansen et al. | |
| 2002/0158905 A1 | 10/2002 | Bazzoni et al. | |
| 2009/0070093 A1 | 3/2009 | Nakanishi et al. | |
| 2010/0177931 A1 | 7/2010 | Whytock et al. | |
| 2012/0229454 A1 | 9/2012 | Hayashi et al. | |
| 2012/0249741 A1* | 10/2012 | Maciocci | G06T 19/006 |
| | | | 348/51 |
| 2013/0104084 A1 | 4/2013 | Mlyniec et al. | |
| 2013/0117377 A1* | 5/2013 | Miller | A63F 13/35 |
| | | | 709/205 |
| 2013/0297690 A1 | 11/2013 | Lucero et al. | |
| 2014/0111547 A1* | 4/2014 | Bilbrey | H04N 21/8133 |
| | | | 345/633 |
| 2014/0152558 A1 | 6/2014 | Salter et al. | |
| 2014/0198101 A1 | 7/2014 | Vilkin et al. | |
| 2014/0204002 A1 | 7/2014 | Bennet et al. | |
| 2014/0225812 A1* | 8/2014 | Hosoya | G02B 27/0093 |
| | | | 345/8 |
| 2014/0267637 A1 | 9/2014 | Hoberman et al. | |
| 2014/0306891 A1 | 10/2014 | Latta et al. | |
| 2015/0371441 A1 | 12/2015 | Shim | |
| 2016/0005229 A1* | 1/2016 | Lee | G06T 11/60 |
| | | | 345/419 |
| 2017/0060230 A1 | 3/2017 | Faaborg et al. | |
| 2017/0161957 A1* | 6/2017 | Yajima | G06V 20/20 |
| 2017/0235143 A1 | 8/2017 | Chi et al. | |
| 2017/0236463 A1* | 8/2017 | Chi | G02B 26/0833 |
| | | | 345/694 |
| 2017/0243403 A1* | 8/2017 | Daniels | G06F 3/1454 |
| 2017/0336941 A1 | 11/2017 | Gribetz | |
| 2023/0015916 A1* | 1/2023 | Ryu | H04L 67/148 |
| 2023/0401346 A1* | 12/2023 | Presley | H04L 9/3213 |

* cited by examiner

SYSTEMS AND METHODS TO EXTEND AN INTERACTIVE SPACE ACROSS MULTIPLE PLATFORMS

CROSS-REFERENCE TO RELATED APPLICATION

This application is a continuation of U.S. patent application Ser. No. 15/787,564, filed Oct. 18, 2017 and now allowed. U.S. patent application Ser. No. 15/787,564 is hereby incorporated by reference herein in its entirety.

FIELD OF THE INVENTION

The systems and methods described herein relate to extending an interactive space across multiple computing platforms.

BACKGROUND OF THE INVENTION

There are many types of vision systems that provide virtual and/or augmented reality (VR and/or AR) displays. In particular, wearable technology such as head mounted displays (HMD) may be used. In some instances, mobile or handheld device—such as smartphones or tablet computers—may provide access to AR and VR environments. However, such devices are typically not as sophisticated and/or immersive as wearable technology.

SUMMARY

One or more implementations of the systems and methods described herein facilitate extending an interactive experience across multiple computing platforms, including both wearable technology and mobile or handheld devices. The interactive experience may take place in an interactive space. An interactive space may include one or both of a virtual reality environment and/or an augmented reality environment. An augmented reality environment may include views of images of virtual content superimposed over views of a real-world environment. A virtual reality environment may include views of images of virtual content within a virtual environment.

One or more implementations of the systems and methods presented herein may facilitate collaborative viewing of an interactive space via both host devices (e.g., headsets) and mobile computing platforms. For example, the interactive space as experienced by a user of a host device (e.g., headset) may be extended to one or more mobile computing platforms. The host device may present views of virtual content perceived to be present in the real world. A given mobile computing platform may be positioned at or near the host device. The mobile computing platform may capture images/video of the user of the host device. The mobile computing platform may then superimpose views of the virtual content being presented by the host device onto the images/video, from the perspective of the mobile computing platform.

A system configured to extend an interactive experience across multiple computing platforms may include one or more of a host device, a mobile computing platform, and/or other components. The host device may be configured to be worn by a user. The host device may include one or more physical processors configured by machine-readable instructions. The machine-readable instructions may include one or more computer program components. The computer program components may include one or more of a control component, a relative location component, a communication component, and/or other components.

The control component may be configured to control one or more image-forming components of host device. The one or more image forming components may be incorporated into the host device. The one or more image-forming components may be controlled to generate light rays to form a first set of images of virtual content. The one or more image-forming components may be configured such that when the host device is installed (e.g. mounted or worn) on the head of a user, the first set of images seen in the host device may be presented to the user and superimposed over his or her views of the real world to create a first view of the interactive space. In the first view, the virtual content may be perceived to be at a first location and/or may be perceived to have a first heading within the interactive space.

The relative location component may be configured to determine information that may convey a location of a mobile computing platform relative to a location of the host device.

The communication component may be configured to effectuate communication of information to the mobile computing platform. The information may include one or more of information defining the virtual content, relative location information, and/or other information. The information defining the virtual content and/or other information may cause the mobile computing platform to generate a second set of images of the virtual content. The second set of images may be superimposed over views of the real-world presented by the mobile computing platform to create a second view of the interactive space visible to the user of the mobile computing platform. In the second view, virtual content may be perceived by the user of the mobile computing platform to be at the first location and/or may be perceived to have a second heading within the interactive space.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
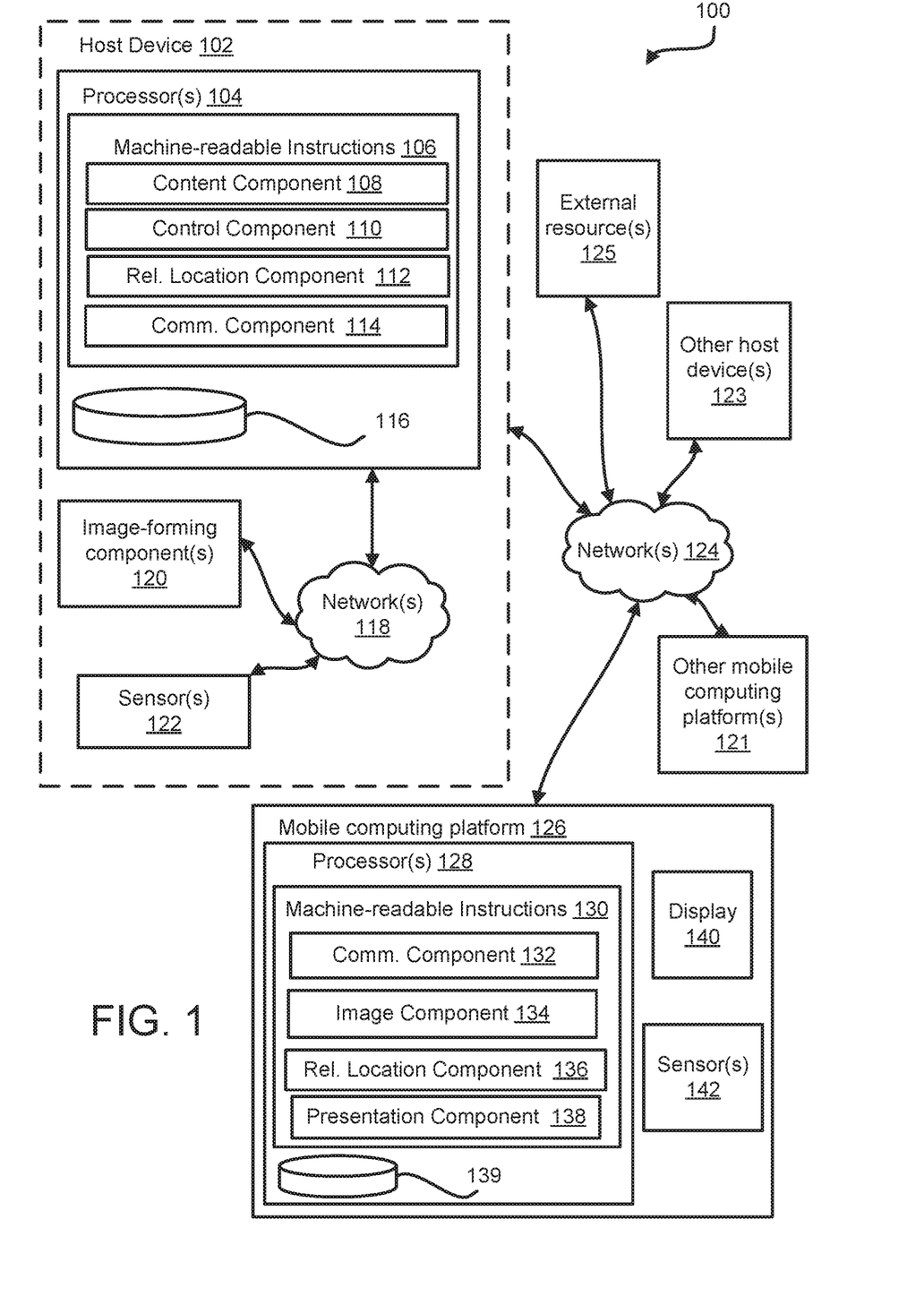
FIG. 1 illustrates a system configured to extend an interactive experience across multiple computing platforms, in accordance with one or more implementations.

FIG. 1 shows a system 100 configured to extend an interactive experience across multiple computing platforms, in accordance with one or more implementations. The interactive experience may take place in an interactive space. The interactive space may include one or more of an augmented reality environment, a virtual reality environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

Collaborative viewing of virtual content in an interactive space may require users to individually wear host devices, such as headsets. The host devices may localize their positions relative to each other, and simultaneously generate images of the virtual content. However, differences in localization and/or environmental mapping by the different host devices may introduce some error as to relative positioning and/or heading of the virtual content as perceived by each of the users, and may generally be processor intensive. Further, if a user does not have their own host device, they may not be able to join in on the collaborative viewing.

One or more implementations of system 100 herein may eliminate some of the issues described above and facilitate collaborative viewing of an interactive space by allowing a user of a common mobile computing platform (such as a smartphone or tablet computer) to obtain views of the interactive space and the virtual content within it, as viewed and manipulated by one or more users of host devices. For example, the interactive space as experienced by a user of a host device may be extended to one or more mobile computing platforms. The host device may present views of virtual content perceived to be present within the real world. In particular, the user of the host device may perceive the virtual content as being present in a given location and having a heading with respect to the user's perspective. A given mobile computing platform may be positioned at or near the host device. The mobile computing platform may be directed to capture images/video of the user of the host device, as he or she interacts with the interactive space created by the host device. The mobile computing platform may be configured to then superimpose views of the virtual content being viewed and interacted with by the user of the host device onto the images/video being presented by the mobile computing platform to its user. The views of the virtual content may be generated by the mobile computing platform from the perspective of the user of the mobile computing platform. More specifically, the user of the mobile computing platform may perceive the virtual content as also being at the given location but having a different heading (e.g., facing a different direction). In some implementations, the different heading may refer to the relative heading that the users perceived. For example, the virtual content may have a heading "facing" the first user, e.g., the first user sees one face of the virtual content. The second user may perceive the virtual content just as it is oriented in the perspective of the first user, but because the second user may be seeing the object from a side of the first user, the second user may see a different face of the virtual content. The virtual content may have a different "heading" (e.g., from perspective of the second user), despite being in the same orientation as in the perspective of the first user. In some implementations, if the user of the mobile computing platform is the same as the user of the host device, the user may configure the mobile computing platform to capture a self-portrait image (e.g., a "selfie") which includes views of the user and of the virtual content as if the virtual content was present in the real world with the user.

In FIG. 1, system 100 may include one or more of a host device 102, one or more other host devices 123, a mobile computing platform 126, one or more other mobile computing platforms 121, and/or other components. It is noted that while some descriptions herein may be directed to host device 102, this is for illustrative purposes only and is not to be considered limiting. For example, it is to be understood that individual ones of one or more other host devices 123 may be configured in the same or similar manner as host device 102. It is further noted that while some descriptions may be directed to mobile computing platform 126, this is for illustrative purposes only and is not to be considered limiting. For example, it is to be understood that individual ones of one or more other mobile computing platforms 121 may be configured in the same or similar manner as mobile computing platform 126.

In some implementations, one or more components of host device 102 may be included with and/or otherwise incorporated into host device 102. By way of non-limiting illustration, host device 102 may include and/or otherwise hold one or more of one or more physical processors 104, one or more image-forming components 120, one or more sensors 122, and/or other components. The host device 102 may be configured to be installed (e.g., worn) on a head of a user. By way of non-limiting illustration, host device 102 may include a headset such as one or more of a head-mounted display (HMD), glasses, goggles, and/or other devices.

In some implementations, one or more components of host device 102 may be included in one or more devices external to host device 102. For example, one or more components may be included in one or more of a desktop computer, a laptop computer, other mobile computer configurations, and/or other computing devices. By way of non-limiting illustration, one or more physical processors 104 and/or other components may be included in a mobile computing device external to host device 102 (not shown in FIG. 1). The host device 102 may be tethered and/or otherwise connected to the one or more external devices. Such connection may be wired (e.g., USB, HDMI, and/or other wired connection) and/or wireless (e.g., Bluetooth, Wi-Fi, and/or other wireless connection).

In FIG. 1, individual image-forming components of one or more image-forming components 120 may be configured to generate light rays to form images of virtual content. The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form and/or perceive coherent virtual content. As a result, the properties of the human perception may be exploited through visual systems, as described herein, employing hardware and/or software architectures to form virtual content (e.g., digital images)

that may be located and/or perceived to be located in the real-world environment by virtue of neuroscience principles. For example, virtual content may be perceived as being present at a given location in the real-world. The virtual content may be perceived to have a particular heading and/or orientation based on a point of view in the interactive space from which the virtual content is being viewed.

Individual ones of one or more image-forming components 120 may include one or more of one or more light sources, one or more optical elements, and/or other components. In some implementations, an individual light source may be arranged on a host device to direct light rays toward one or more optical elements. The one or more image-forming components 120 may be configured such that images of virtual content may be superimposed over a view of the real world to create a view of the interactive space. The view of the interactive space may be based on a point of view from which the interactive space is being experienced. Point of view may correspond to one or more of location in the real world of the user, a heading in the real-world of the user, and/or other information. In some implementations, images may be presented individually to each eye of the user as stereo image pairs.

A light source may comprise one or more of a microelectromechanical systems (MEMS), RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

It is noted that the use of the term "light ray" is not intended to limit the scope of the disclosure to single, discrete, photons and/or packets of photons. Instead, the disclosure may envision a light ray to mean a light beam comprising multiple and/or continuous photons, in one or more implementations.

In some implementations, one or more optical elements of one or more image-forming components 120 may be arranged on host device 102 such that, when host device 102 is installed on the head of a user, the user's gaze may be directed toward the one or more optical elements. In some implementations, an optical element may form at least part of host device 102 through which a user may view the real world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials. A field of view of the interactive space may be dependent on a size, shape, and/or arrangement of one or more optical elements. The field of view of the interactive space may refer to the extent of the interactive space that may be viewable by the user. The field of view of the interactive space may depend on how much of the user's vision field may be encompassed by one or more optical elements. By way of non-limiting illustration, an optical element may be configured to encompass a portion of the user's vision such that outside the boundary of the optical element the user may simply view the real world. By way of non-limiting illustration, an optical element may be configured to encompass all or substantially all of the user's vision such that all or substantially all natural viewing directions may include views of the interactive space. In some implementations, content that may be viewable within a field of view of the interactive space may depend on the user's point of view. The point of view may correspond to the user's location and/or heading within the real-world. By way of non-limiting illustration, by changing their point of view, a user may "look" at different content included in the interactive space.

In some implementations, an optical element may comprise one or more of a waveguide, optical coupling features, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or both eyes of a user.

In some implementations, one or more optical elements of one or more image-forming components 120 may be arranged on host device 102 such that light rays generated by one or more light sources may be directed at the one or more optical elements, coupled into the one or more optical elements, and directed out of the one or more optical element into an eye of a user. The images of virtual content may be projected onto a retina of an eye such that the images may be superimposed over the user's view of the real world. The field of view of the interactive space may be dependent on a range over which light rays may be projected into the user's eye(s). The range may refer to one or both of a horizontal sweeping angle and/or a vertical sweeping angle over which light rays are directed out of an optical element and into an eye. By way of non-limiting illustration, the range over which the light rays are provided to the user's eye(s) may be limited so that in areas outside the range the user may simply view the real world (e.g., no image projection).

Figure 4:
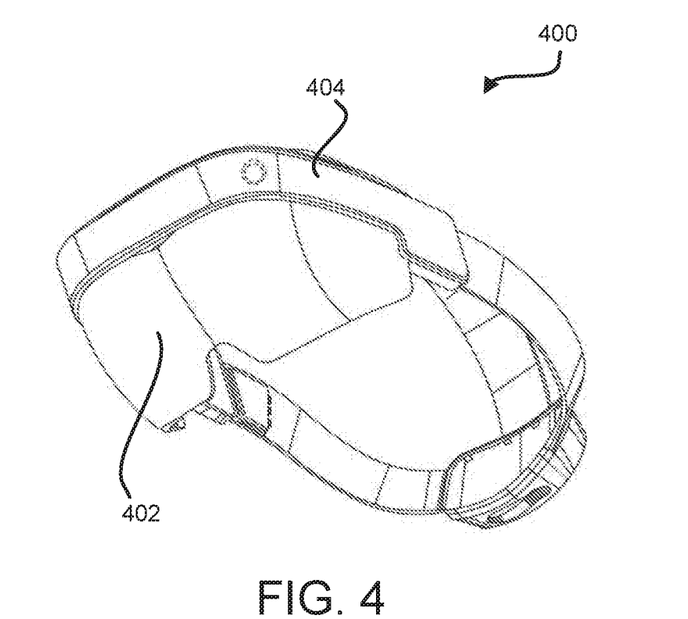
FIG. 4 illustrates an exemplary head-mounted display.

Referring now to FIG. 4, in some implementations, a headset (e.g., host device 102 in FIG. 1) may comprise an HMD 400. One or more components of system 100 (FIG. 1) may be held by, incorporated into, and/or otherwise comprise part of HMD 400. By way of non-limiting illustration, an optical element of an image-forming component may comprise at least part of a visor portion 402 of HMD 400. Components such as one or more of physical processors, light sources of image-forming components, one or more sensors, and/or other components may be incorporated into a housing portion 404 and/or other portions of HMD 400.

Figure 5:
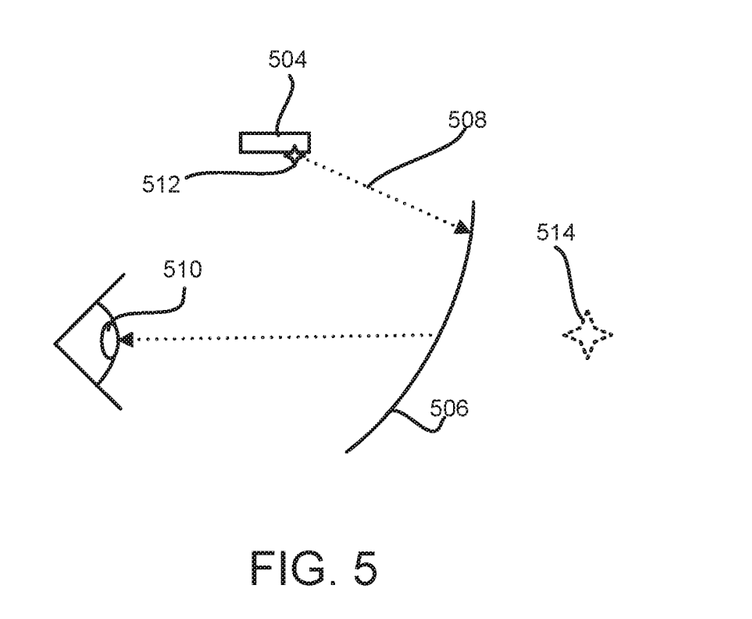
FIG. 5 illustrates a configuration of a light source and an optical element of an image-forming component, in accordance with one or more implementations.

FIG. 5 illustrates a configuration of a light source 504 and an optical element 506 of an image-forming component, in accordance with one or more implementations. The optical element 506 may comprise, and/or may be part of, a visor portion of a headset. The light source 504 may be configured to emit light rays, including light ray 508. The light rays may form images, including image 512. The light rays may be received by optical element 506 and provided to an eye 510 of a user. The light rays received by eye 510 may form virtual content 514 (e.g., a virtual object) perceived to lie within three-dimensional space in the user's vision field or portion thereof.

Returning to FIG. 1, one or more sensors 122 of host device 102 may include one or more of a depth sensor, an image sensor, a location sensor, a heading sensor, and/or other sensors.

A depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual surfaces within the real world. The depth information may specify, for individual points, one or more of an individual distance of the point from the depth sensor, an individual orientation of the point with respect to the depth sensor, and/or other information. In some implementations, shape of an object, heading of a surface and/or object, and/or other information may be determined from depth information. In some implementations, a depth sensor may comprise one or more of a time-of-flight sensor, a structured light sensor, an unstructured light sensor, an active stereo pair, a passive stereo pair, and/or other depth sensing devices.

An image sensor may be configured to generate output signals conveying view information and/or other information. View information may specify visual content within a field of view of the image sensor. The visual content may include real-world objects and/or surfaces present in the real world. The view information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A location sensor may be configured to generate output signals conveying geo-location of the location sensor. A location sensor may include a global positioning system (GPS) and/or other location sensors.

A heading sensor may be configured to generate output signals conveying heading information related to determining the heading of virtual content presented by image forming component(s) 120 and able to be perceived by the user of host device 102. The heading information may include orientation and/or heading. In some implementations, heading information may be specified with respect to one or more degrees of freedom. By way of non-limiting illustration, heading information may specify one or more of pitch angle, roll angle, and/or yaw angle of host device 102 over time. The heading sensor may include an inertial measurement unit (IMU) and/or others sensors. In some implementations, heading may be determined through image processing techniques and/or other techniques.

In FIG. 1, one or more of processor(s) 104, one or more image-forming components 120, one or more sensors 122, and/or other components of host device 102 may be operatively linked via one or more electronic communication links. For example, such electronic communication links may be established, at least in part, via network(s) 118. Network(s) 118 may comprise one or both of wired and/or wireless communications. It will be appreciated that this is not intended to be limiting and that the scope of this disclosure includes implementations in which one or more of processor(s) 104, one or more image-forming components 120, one or more sensors 122, and/or other components may be operatively linked via some other communication media.

In FIG. 1, mobile computing platform 126 may be a handheld device. The mobile computing platform 126 may include one or more of a smartphone, a tablet, and/or other devices. The mobile computing platform 126 may comprise one or more of one or more physical processors 128, a display 140, one or more sensors 142, and/or other components.

The display 140 may be configured to present content. The display 140 may include one or more of a display screen, a touchscreen display, a projector display, and/or other devices configured to present content.

In some implementations, individual sensors of one or more sensors 142 of mobile computing platform 126 may be the same as or similar to individual sensors of one or more sensors 122 of host device 102. By way of non-limiting illustration, one or more sensors 142 may include one or more of a depth sensor, an image sensor, a location sensor, a heading sensor, and/or other sensors. In some implementations, a field of view of the interactive space provided by mobile computing platform 126 may be dependent on a field of view of an image sensor and/or other information. The field of view of the interactive space may refer to the extent of the interactive space that may be viewable by the user. By way of non-limiting illustration, view information conveyed by output signals of an image sensor may specify visual content present in the real world within a field of view of the image sensor. The field of view of the image sensor may dictate the extent of the interactive space which may be viewed via display 140.

In FIG. 1, one or more physical processors 104 of host device 102 may be configured by machine-readable instructions 106. Executing machine-readable instructions 106 may cause one or more physical processors 104 to facilitate extending an interactive experience across multiple platforms. The machine-readable instructions 106 may include one or more of a content component 108, a control component 110, a relative location component 112 (abbreviated "Rel. Location Component 112" in FIG. 1), a communication component 114 (abbreviated "Comm. Component 114" in FIG. 1), and/or other components.

The content component 108 may be configured to obtain information defining virtual content. The information defining the virtual content may include information defining one or more of a visual appearance of the virtual content, one or more interactive capabilities of the virtual content, locomotion of the virtual content, and/or other information. The visual appearance of virtual content may include one or more of a two-dimension representation of the virtual content, a three-dimensional representation of the virtual content, a color of the virtual content, and/or other information. The interactive capabilities may refer to attributes related to ability of a user to manipulate the virtual content within the interactive space. Manipulation may be provided by gesture-based input and/or other input. The locomotion of the virtual content may refer to movement of virtual content in the interactive space (e.g., static vs. animated).

The control component 110 may be configured to control individual ones of one or more image-forming components 120. Controlling an image-forming components 120 may include controlling one or more of one or more light sources, one or more optical elements, and/or other components.

One or more light sources may be controlled to generate light rays in accordance with virtual content to be presented to the user of host device 102. A light source may generate light rays to form a digital image, which when directed into a user's eyes, may be perceived as virtual content in three-dimensional space within the user's view of the real-world.

The virtual content may be perceived by the viewing user to be present at a location within the real world. The virtual content may have a particular heading with respect to the viewing user. In some implementations, the location and/or heading of virtual content may be based on a view of the interactive space. The view may correspond to a particular field of view from a particular point of view of the user. The point of view may correspond to a location and/or heading of the host device 102. In some implementations, a user may interact with the virtual content affecting one or more of the perceived location of the virtual content, the perceived heading of the virtual content, and/or other aspects of the virtual content.

By way of non-limiting example, virtual content may include a simulated web browser and/or other content. The web browser may be generated by forming an image of a two-dimensional plane. The plane may be perceived to be at a location in front of the user, e.g., arm's length away. The plane may have a particular heading insofar that a surface of the plane that includes web content may face the user (e.g. the user may look straight ahead and view the surface of the plane). The user may change their location and/or heading (e.g., the user may walk around and/or move their head). The plane forming the web browser may maintain the prior location and/or heading relative the user. For example, the user may turn to one side such that the surface of the plane may now be facing a side of the user (as opposed to the user looking head-on to the surface of the plane).

By way of non-limiting illustration, one or more image-forming components 120 may be controlled to generate light rays to form a first set of images of virtual content. The one or more image-forming components 120 may be configured such that when host device 102 installed on a head of a user, the first set of images may be presented to the user and superimposed over views of the real world. The views of the real-world and the superimposed first set of images may create a first view of the interactive space. In the first view, the virtual content may be perceived to be at a first location and may have a first heading within the interactive space as seen by the user of host device 102.

In some implementations, relative location component 112 may be configured to obtain relative location information. The relative location information may convey a location of mobile computing platform 126 relative to a location of host device 102. The relative location information may include one or more of a distance of a mobile computing platform 126 from host device 102, a distance of mobile computing platform 126 from a fixed reference, a heading of mobile computing platform 126 relative to host device 102, a heading of mobile computing platform 126 relative to the fixed reference, and/or other information.

In some implementations, relative location components 112 and/or 136 may be configured to determine relative location information of the host device 102 and mobile computing platform 126, respectively. The relative location information may be determined based on output signals from one or more sensors 122 or 142, respectively.

By way of non-limiting illustration, relative location information may be determined based on depth information conveyed by output signals from a depth sensor. The depth information may include a point cloud. Presence of the mobile computing platform 126 may be determined from the point cloud based on recognition of size and/or shape of mobile computing platform 126.

By way of non-limiting illustration, relative location information may be determined based on view information conveyed by output signals of an image sensor of host device 102. The view information may define images and/or video. Presence of the mobile computing platform 126 may be determined from the view information using one or more image processing techniques. The location and/or heading of mobile computing platform 126 may be determined and/or tracked within images and/or video using one or more image processing techniques. The one or more image processing techniques may include object detection, bundle adjustment, and/or other computer vision techniques.

The communication component 114 may be configured to establish a connection between host device 102 and mobile computing platform 126. The connection may include a wired and/or wireless connection.

The communication component 114 may be configured to effectuate communication of information to, and/or receive information from, mobile computing platform 126.

The information communicated to mobile computing platform 126 may include one or more of relative location information determined by host device 102, information defining virtual content, and/or other information. The information communicated to and/or obtained by mobile computing platform 126 may cause mobile computing platform 126 to generate a set of images of the virtual content. The set of images generated by mobile computing platform 126 may be superimposed over views of the real-world to create a second view of the interactive space from the point of view of the mobile computing platform 126. For example, the virtual content may be perceived to be at the same location that it may be perceived by the user of host device 102 but may have a different heading within interactive space because of the different point of view of mobile computing platform 126.

By way of non-limiting illustration, the user of host device 102 may perceive virtual content at a range in front of them. The user of host device 102 may view the virtual content with a first surface of the virtual content facing the user of host device 102 (e.g., a surface of a plane forming a web browser as discussed above). The user of mobile computing platform 126 may be standing to one side of the user. The relative location information and/or information defining the virtual content may be received at mobile computing platform 126. The user of mobile computing platform 126 may take images and/or video of the real world that includes views of the user of host device 102. The display 140 of mobile computing platform 126 may present the images and/or video. The mobile computing platform 126 may be configured to generate images of the virtual content that may be superimposed over the views of the real-world shown by the display 140. The images of the virtual content as shown on the display 140 may be configured such that the virtual content may also be perceived at the range in front of the user of host device 102. However, the user of mobile computing platform 126 may view a different surface of the virtual content based on the different point of view of mobile computing platform 126 compared to point of view of host device 102.

In FIG. 1, one or more physical processors 128 of computing platform 126 may be configured by machine-readable instructions 130. Executing machine-readable instructions 130 may cause one or more physical processors 128 to facilitate extending an interactive experience across multiple platforms. The machine-readable instructions 130 may include one or more of a communication component 132 (abbreviated "Comm. Component 132" in FIG. 1), an image component 134, a relative location component 136 (abbreviated "Rel. Location Component 136 in FIG. 1), a presentation component 138, and/or other components.

The communication component 132 may be configured to establish a connection between host device 102 and mobile computing platform 126. The connection may include a wired and/or wireless connection. The communication component 132 may be configured to obtain information from host device 102. By way of non-limiting illustration, communication component 132 may obtain one or more of relative location information, information defining virtual content, and/or other information.

The image component 134 may be configured to obtain one or more of view information and/or other information. The view information may be derived from output signals generated by an image sensor of mobile computing platform 126. The view information may define images conveying views of the real world. The image component 134 may be configured to effectuate presentation of the views of the real-world on display 140. Images of virtual content may be superimposed over the views of the real-world (e.g., via presentation component 138).

The relative location component 136 may be configured to obtain relative location information. The relative location component 136 may be configured to obtain relative location information from host device 102 (e.g., via communication component 132). The relative location information may convey a location of mobile computing platform 126 relative to a location of host device 102. The relative location information may include one or more of a distance of the mobile computing platform 126 from the host device 102, a distance of mobile computing platform 126 from a fixed reference, a heading of mobile computing platform 126 relative host device 102, a heading of mobile computing platform 126 relative to the fixed reference, and/or other information.

In some implementations, relative location component 136 may be configured to determine relative location information. The relative location information may be determined based on output signals from one or more sensors 142.

By way of non-limiting illustration, relative location information may be determined based on view information conveyed by output signals of an image sensor of mobile computing platform 126. The view information may define images and/or video. Presence of the host device 102 may be determined from the view information using one or more image processing techniques. The location and/or heading of the mobile computing platform 126 relative to host device 102 may be determined and/or tracked within images and/or video using one or more image processing techniques. The one or more image processing techniques may include object detection, bundle adjustment, and/or other computer vision techniques.

The presentation component 138 may be configured to obtain one or more of information defining virtual content (e.g., via communication component 132), relative location information (e.g., via communication component 132 and/or relative location component 136), view information (e.g., via image component 134), and/or other information. The presentation component 138 may be configured to effectuate presentation of a view of the interactive space on display 140 of mobile computing platform 126. The presentation component 138 may be configured to generate information defining the view of the interactive space based on one or more of the information defining the virtual content, the relative location information, view information, and/or other information.

Generating the information defining the view of the interactive space may include determining a perceived location and/or a perceived heading of virtual content. In some implementations, a perceived location and/or a perceived heading of virtual content from the perspective of mobile computing platform 126 may be based on one or more of the relative location information, the information defining the virtual content, the perceived location and/or perceived heading of the virtual content from the perspective of host device 102, and/or other information. By way of non-limiting illustration, based on a perceived first location and/or a perceived first heading of the virtual content as seen from host device 102 and the relative location information, presentation component 138 may be configured to determine a perceived second location and/or a perceived second heading of the virtual content as seen from mobile computing platform 126. Using conventional geometric and spatial considerations, if the first location and/or first heading are known, and the relative location information is known (e.g., a distance of mobile computing platform 126 from host device 102, a distance of mobile computing platform 126 from a fixed reference, a heading of mobile computing platform 126 relative host device 102, a heading of mobile computing platform 126 relative to the fixed reference, and/or other information), the second location and/or second heading may be determined. In some implementations, the first location and the second location may be the same location (e.g., both users may view the virtual content at the same perceived location). The second heading may be determined based on the relative location information and the first heading. By knowing the heading of mobile computing platform 126 relative host device 102 and the first heading of the virtual content, the second heading of the virtual content as it is to be perceived via the mobile computing platform 126 may be determined.

Figure 6:
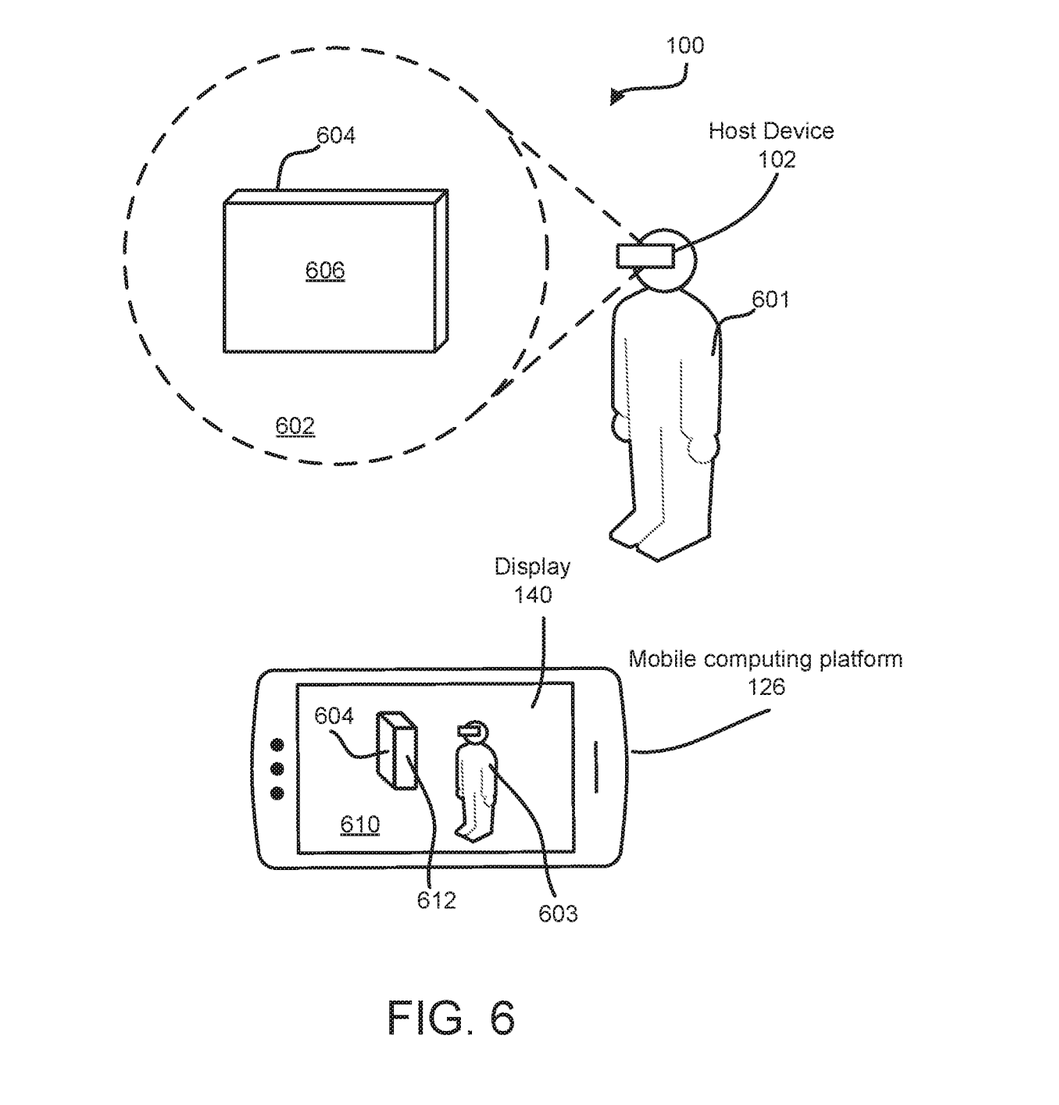
FIG. 6 illustrates an implementation of the system of FIG. 1 showing a view of the interactive space as seen from a host device and another view of the interactive space as seen from a mobile computing platform.

FIG. 6 illustrates an implementation of system 100 of FIG. 1 showing a first view 602 of the interactive space as seen from host device 102 and a second view 610 of the interactive space as seen from mobile computing platform 126.

The host device 102 may be installed on a head of a user 601. The host device 102 may comprise a headset. The first view 602 (depicted within the dashed circular area) may represent a view of an augmented reality space as seen by user 601. For example, user 601 may view virtual content 604. The virtual content 604 may be perceived at a first location. For example, the first location may be in front of the user. The virtual content 604 may be perceived as having a first heading. For example, the first heading may correspond to a first surface 606 of virtual content 604 facing user 601.

The mobile computing platform 126 may include display 140. The second view 610 of the interactive space may be presented on display 140. The second view 610 may include a depiction 603 of user 601, representing user 601's location in the real world. The second view 610 may include depictions of virtual content 604. The virtual content 604 may be perceived at the first location (e.g., the same location in front of depiction 603 of user 601). The virtual content 604 may be perceived to have a second heading. The second heading may be determined based on the first heading and the location of mobile computing platform 126 relative host device 102. For example, user 601 perceives virtual content 604 with first surface 606 facing user 601. The virtual content 604 in second view 610 shows the second heading of virtual content 604, e.g., a second surface 612 of virtual content 604 is facing the viewer of display 140. The second heading may be determined to maintain the perception that first surface 606 is facing user 601.

The depiction in FIG. 6 is illustrative and not to be considered limiting. For example, it is to be understood that user of mobile computing platform 126 may move though through the real world while continuing to capture images and/or video of user 601. The display 140 of mobile computing platform 126 may continue to show views of the virtual content that appear to be present in the real world that correlate or reflect the view of the virtual content as it appears to the wearer of host device 102—however, these views are presented from the perspective of the mobile computing platform's 126 location relative to host device 102. This allows the user of the mobile computing platform 126 to explore the interactive space independently of the position of host device 102.

In FIG. 1, host device 102, one or more other host devices 123, mobile computing platform 126, one or more other mobile computing platforms 121, external resource(s) 125, and/or other components may be operatively linked via one or more electronic communication links. For example, such electronic communication links may be established, at least in part, via network(s) 124. Network(s) 124 may comprise one or both of wired and/or wireless communications (e.g., Bluetooth, Wi-Fi, etc.). It will be appreciated that this is not intended to be limiting and that the scope of this disclosure includes implementations in which one or more of host device 102, one or more other host devices 123, mobile computing platform 126, one or more other mobile computing platforms 121, external resource(s) 125, and/or other components may be operatively linked via some other communication media. In some implementations, network(s) 118 may be the same as network(s) 124 or the networks may be separate and distinct networks.

The external resource(s) 125 may include sources of information, hosts, external entities participating with system 100, providers of virtual content, and/or other resources. In some implementations, some or all of the functionality attributed herein to external resource(s) 125 may be provided by resources included in system 100.

The processor(s) 104 may include and/or have access to electronic storage 116, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 116 may comprise non-transitory electronic storage media that electronically stores information. The electronic storage media of electronic storage 116 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 104, information received from other components of system 100, and/or other information that enables processor(s) 104 to function as described herein.

Processor(s) 104 is configured to provide information-processing capabilities for host device 102. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, and/or other components. Processor(s) 104 may be configured to execute component 108, 110, 112, 114, and/or other components by software; hardware; firmware; some combination of software, hardware, and/or firmware; and/or other mechanisms for configuring processing capabilities on processor(s) 104.

It should be appreciated that although components 108, 110, 112, and 114 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, 112, 114, and/or other components.

The processor(s) 128 of mobile computing platform 126 may include and/or have access to electronic storage 139, and/or other components. The processor(s) 128 may include communication lines or ports to enable the exchange of information with a network and/or other components of system 100. Illustration of processor(s) 128 in FIG. 1 is not intended to be limiting. The processor(s) 128 may include a plurality of hardware, software, and/or firmware components operating together to provide the functionality attributed herein to processor(s) 128. For example, processor(s) 128 may be implemented by a cloud of computing platforms operating together as processor(s) 128.

The electronic storage 139 may comprise non-transitory electronic storage media that electronically stores information. The electronic storage media of electronic storage 139 may include one or both of system storage that is provided integrally (i.e., substantially non-removable) with processor(s) 128 and/or removable storage that is removably connectable to processor(s) 128 via, for example, a port or a drive. A port may include a USB port, a firewire port, and/or other port. A drive may include a disk drive and/or other drive. The electronic storage 139 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 139 may include one or more virtual storage resources (e.g., cloud storage, a virtual private network, and/or other virtual storage resources). The electronic storage 139 may store software algorithms, information determined by processor(s) 128, information received from other components of system 100, and/or other information that enables processor(s) 128 to function as described herein.

Processor(s) 128 is configured to provide information-processing capabilities in mobile computing platform 126. As such, processor(s) 128 may include one or more of a physical processor, a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include one or more processing units. These processing units may be physically located within the same device, or processor(s) 128 may represent processing functionality of a plurality of devices operating in coordination. The processor(s) 128 may be configured to execute components 132, 134, 136, 138, and/or other components. Processor(s) 128 may be configured to execute component 132, 134, 136, 138, and/or other components by software; hardware; firmware; some combination of software, hardware, and/or firmware; and/or other mechanisms for configuring processing capabilities on processor(s) 128.

It should be appreciated that although components 132, 134, 136, and/or 138 are illustrated in FIG. 1 as being co-located within a single processing unit, in implementations in which processor(s) 128 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 128 may be configured to execute one or more additional components that may perform some or all of the functionality attributed to individual ones of components 132, 134, 136, 138, and/or other components.

Figure 2:
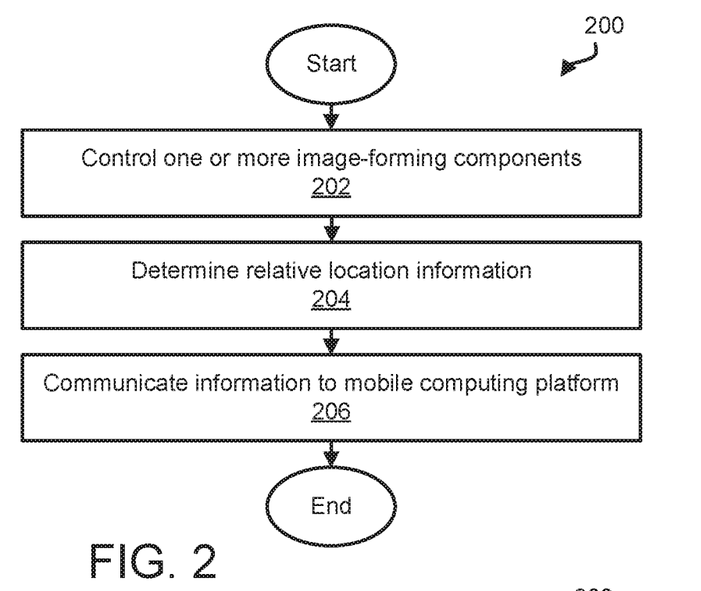
FIG. 2 illustrates a method to extend an interactive experience across multiple computing platforms, in accordance with one or more implementations.
Figure 3:
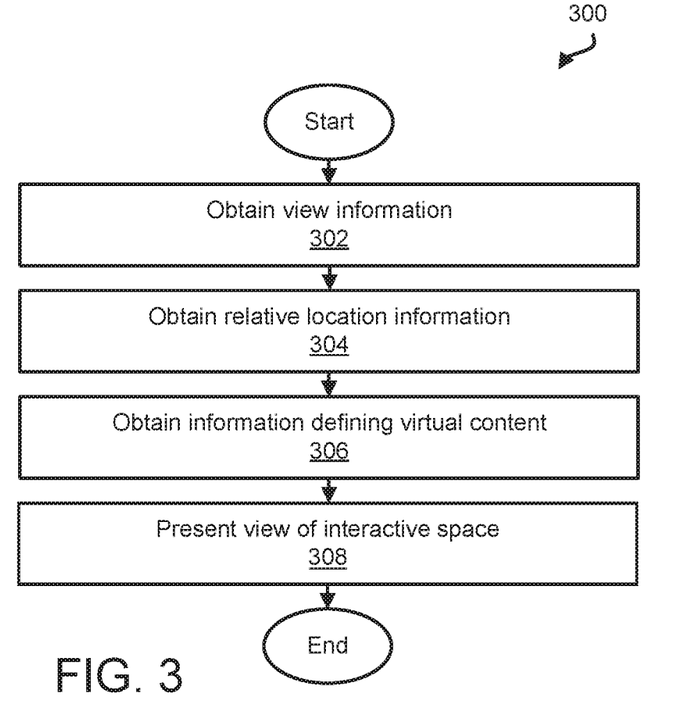
FIG. 3 illustrates a method to extend an interactive experience across multiple computing platforms, in accordance with one or more implementations.

FIG. 2 and FIG. 3 illustrate method 200 and 300, respectively, to extend an interactive experience across multiple platforms, in accordance with one or more implementations. The operations of individual ones of method 200 and/or method 300 presented below are intended to be illustrative. In some implementations, method 200 and/or method 300 may be accomplished with one or more additional operations not described, and/or without one or more of the operations discussed. Additionally, the order in which the operations of method 200 and method 300 are illustrated in FIG. 2 and FIG. 3, respectively, and described below is not intended to be limiting.

In some implementations, method 200 and/or method 300 may be implemented in and/or using a system, such as system 100 shown in FIG. 1 and described herein. One or more physical processors may include one or more devices executing one or more of the operations of method 200 and/or method 300 in response to instructions stored electronically on electronic storage media. The one or more processing devices may include one or more devices configured through hardware, firmware, and/or software to be specifically designed for execution of one or more of the operations of method 200 and/or method 300.

Referring to method 200 in FIG. 2, at an operation 202, one or more image-forming components may be controlled. The one or more image forming components may be held by a host device. The one or more image-forming components may be controlled to generate light rays to form a first set of images of virtual content. The one or more image-forming components may be configured such that when the host device is installed on a head of a user, the first set of images may be presented to the user and superimposed over views of the real world to create a first view of the interactive space. In the first view, the virtual content may be perceived to be at a first location and/or may be perceived to have a first heading within the interactive space. In some implementations, operation 202 may be performed by one or more physical processors executing a control component the same as or similar to control component 110 (shown in FIG. 1 and described herein).

At an operation 204, relative location information may be determined. The relative location information may convey a location of a mobile computing platform relative to a location of the host device. In some implementations, operation 204 may be performed by one or more physical processors executing a relative location component the same as or similar to relative location component 112 and/or 136 (shown in FIG. 1 and described herein).

At an operation 206, information may be communicated to the mobile computing platform. The information may include one or more of information defining the virtual content, relative location information, and/or other information. The information defining the virtual content and/or other information may cause the mobile computing platform to generate a second set of images of the virtual content. The second set of images may be superimposed over views of the real-world to create a second view of the interactive space. In the second view, virtual content may be perceived to be at the first location and/or may be perceived to have a second heading within the interactive space. In some implementations, operation 206 may be performed by one or more physical processors executing a communication component the same as or similar to communication component 114 (shown in FIG. 1 and described herein).

Referring to method 300 in FIG. 3, at an operation 302, view information may be obtained. View information may be derived from output signals generated by an image sensor coupled to a mobile computing platform. The view information may define views of the real-world over which a second set of images of the virtual content may be superimposed. In some implementations, operation 302 may be performed by one or more physical processors executing an image component the same as or similar to image component 134 (shown in FIG. 1 and described herein).

At an operation 304, relative location information may be obtained. The relative location information may convey a location of the mobile computing platform relative to a location of a host device. In some implementations, operation 304 may be performed by one or more physical processors executing a relative location component the same as or similar to relative location component 112 and/or 136 (shown in FIG. 1 and described herein).

At an operation 306, information defining the virtual content and/or other information may be obtained. The information defining the virtual content and/or other information may cause the mobile computing platform to generate the second set of images of the virtual content. The second set of images may be superimposed over views of the real-world to create a second view of the interactive space. In the second view, virtual content may be perceived to be at the first location and/or may be perceived to have the second heading within the interactive space. In some implementations, operation 306 may be performed by one or more physical processors executing a communication component the same as or similar to communication component 132 (shown in FIG. 1 and described herein).

At an operation 308, the second view of the interactive space may be presented. The second view may be presented via a display of the mobile computing platform. In some implementations, operation 308 may be performed by one or more physical processors executing a presentation component the same as or similar to presentation component 138 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other implementation.

What is claimed is:

1. A host device configured to extend views of virtual content across multiple platforms, the host device comprising:
    one or more image-forming components; and
    one or more physical processors configured by machine-readable instructions to:
        control one or more image-forming components to generate light rays to form a first set of images of virtual content, the one or more image-forming components being configured to present the first set of images superimposed over a real-world scene to create a first view of an interactive space where the virtual content is perceived to be at a first location and perceived to have a first heading from a perspective of the host device within the interactive space;
        determine relative location information based on sensor data depicting a mobile computing platform in the real-world scene, the relative location information conveying a location of the mobile computing platform relative to a location of the host device, wherein the sensor data is obtained from one or more sensors of at least one of the host device or a mobile computing platform; and
        effectuate communication of information defining the virtual content and the relative location information to the mobile computing platform, the information defining the virtual content and the relative location information causing the mobile computing platform to generate and display a second set of images of the virtual content, the second set of images being superimposed over the real-world scene to create a second view of the interactive space where the virtual content is perceived to be at the first location and perceived to have a second heading within the interactive space, wherein the virtual content is perceived to have the second heading based on the relative location information defined in the information communicated to the mobile computing platform.

2. The host device of claim 1, wherein:
    the first view corresponds to a first field of view from a first point of view in the interactive space, the first point of view corresponding to one or both of a location and heading of the host device; and
    the second view corresponds to a second field of view from a second point of view in the interactive space, the second point of view corresponding to one or both of a location and a heading of the mobile computing platform.

3. The host device of claim 1, wherein the one or more physical processors are further configured by the machine-readable instructions to:
    determine the second heading based on the first heading and the relative location information.

4. The host device of claim 1, wherein the mobile computing platform is configured to:
    obtain view information derived from output signals generated by an image sensor coupled to the mobile computing platform, the view information defining views of the real-world scene over which the second set of images of the virtual content are superimposed.

5. The host device of claim 4, wherein the views of the real-world scene over which the second set of images of the virtual content are superimposed further include depictions of a user of the host device, as the user appears in the real-world scene.

6. The host device of claim 1, wherein the relative location information is determined at one or both of the host device or the mobile computing platform.

7. A method to extend views of virtual content across multiple platforms, the method comprising:
    controlling one or more image-forming components incorporated into a host device, the one or more image-forming components being controlled to generate light rays to form a first set of images of virtual content, the one or more image-forming components being configured to present the first set of images superimposed over a real-world scene to create a first view of an interactive space where the virtual content is perceived to be at a first location and perceived to have a first heading from a perspective of the host device within the interactive space;
    determining relative location information based on sensor data depicting a mobile computing platform in the real-world scene, the relative location information conveying a location of the mobile computing platform relative to a location of the host device, wherein the sensor data is obtained from one or more sensors of at least one of the host device or a mobile computing platform; and
    effectuating communication of information defining the virtual content and the relative location information to the mobile computing platform, the information defining the virtual content and the relative location information causing the mobile computing platform to generate and display a second set of images of the virtual content, the second set of images being superimposed over the real-world scene to create a second view of the interactive space where the virtual content is perceived to be at the first location and perceived to have a second heading within the interactive space, wherein the virtual content is perceived to have the second heading based on the relative location information defined in the information communicated to the mobile computing platform.

8. The method of claim 7, wherein:
the first view corresponds to a first field of view from a first point of view in the interactive space, the first point of view corresponding to one or both of a location and heading of the host device; and
the second view corresponds to a second field of view from a second point of view in the interactive space, the second point of view corresponding to one or both of a location and/or a heading of the mobile computing platform.

9. The method of claim 7, further comprising:
determining the second heading based on the first heading and the relative location information.

10. The method of claim 7, further comprising:
obtaining view information derived from output signals generated by an image sensor coupled to the mobile computing platform, the view information defining views of the real-world scene over which the second set of images of the virtual content are superimposed.

11. The method of claim 10, wherein the views of the real-world scene over which the second set of images of the virtual content are superimposed further include depictions of a user of the host device, as the user appears in the real-world scene.

12. The method of claim 7, wherein the relative location information is determined at one or both of the host device or the mobile computing platform.

13. The host device of claim 1, wherein the sensor data includes at least one image of the mobile computing platform in the real-world scene.

14. The method of claim 7, wherein the sensor data includes at least one image of the mobile computing platform in the real-world scene.

* * * * *